United States Patent
Paris, Jr. et al.

(10) Patent No.: US 9,679,170 B2
(45) Date of Patent: Jun. 13, 2017

(54) MATERIAL TRACKING SYSTEM

(71) Applicant: Prime ITS, Houston, TX (US)

(72) Inventors: Marion E. Paris, Jr., Lincolnton, NC (US); Robert U. Simmons, Hickory, NC (US)

(73) Assignee: Prime ITS, Houston, TX (US)

( * ) Notice: Subject to any disclaimer, the term of this patent is extended or adjusted under 35 U.S.C. 154(b) by 0 days.

(21) Appl. No.: 14/305,865

(22) Filed: Jun. 16, 2014

(65) Prior Publication Data

US 2014/0368318 A1 Dec. 18, 2014

Related U.S. Application Data

(60) Provisional application No. 61/835,892, filed on Jun. 17, 2013.

(51) Int. Cl.
| | |
|---|---|
| *A61J 7/04* | (2006.01) |
| *G06K 7/10* | (2006.01) |
| *G06Q 10/08* | (2012.01) |
| *G06Q 10/10* | (2012.01) |
| *G06F 19/00* | (2011.01) |
| *G06Q 20/20* | (2012.01) |

(52) U.S. Cl.
CPC ............ *G06K 7/10009* (2013.01); *A61J 7/04* (2013.01); *G06Q 10/087* (2013.01); *G06Q 10/10* (2013.01); *G06F 19/326* (2013.01); *G06F 19/3456* (2013.01); *G06F 19/3475* (2013.01); *G06F 19/3481* (2013.01); *G06Q 20/208* (2013.01)

(58) Field of Classification Search
USPC .......................................................... 221/2
See application file for complete search history.

(56) References Cited

U.S. PATENT DOCUMENTS

| | | | |
|---|---|---|---|
| 6,652,495 B1* | 11/2003 | Walker ................. | A61L 2/0088 |
| | | | 604/317 |
| 2005/0265889 A1 | 12/2005 | Wu et al. | |
| 2008/0190953 A1* | 8/2008 | Mallett .............. | A61B 19/0248 |
| | | | 221/13 |

(Continued)

OTHER PUBLICATIONS

Written Opinion and Search Report received in corresponding PCT Appl. PCT/US2014/042545, mail date Oct. 17, 2014.

*Primary Examiner* — Steven Lim
*Assistant Examiner* — Benyam Haile
(74) *Attorney, Agent, or Firm* — Blank Rome LLP

(57) ABSTRACT

A system monitors the distribution of a disinfectant having an expiration. The system has distribution containers and use containers, each having a volume for dispensing the disinfectant. A reader of the system can read identifiers associated with the containers, and a database of the system can associate the volumes and the expiration of the disinfectant contained in each of the containers. During monitoring, processing equipment of the system tracks each of the volumes of the disinfectant, the expiration of the disinfectant, and the identifiers of the containers. For example, the processing equipment can log the dispensing of the disinfectant from the distribution container to the use containers and can log any amount of the dispensed disinfectant in the use containers that was noted used. Additionally, the processing equipment can determine that the distribution container or any of the user containers have disinfectant past the expiration.

37 Claims, 9 Drawing Sheets

(56) References Cited

U.S. PATENT DOCUMENTS

2011/0084835 A1    4/2011   Whitehouse et al.
2013/0204227 A1*   8/2013   Bochenko ........... G06F 19/3456
                                                            604/506
2014/0379874 A1*  12/2014   Starr .................... H04L 67/12
                                                            709/219

* cited by examiner

*600*

DISPENSER | LOGOUT ((SCANNING FOR BOTTLES/CARTS))

DRUM INFORMATION

| EXPIRATION DATE | FILL DATE | AMOUNT DISPENSED (%) |
|---|---|---|
| 04/01/13 | 03/01/13 | 48 (1.88%) |

DISPENSER | LOGOUT

BOTTLE INFORMATION

| DESCRIPTION | LAST FILL DATE | CLEAR SCAN |
|---|---|---|
| 16 OZ BOTTLE | 03/15/13 4:01PM | |

*612*

AMOUNT LEFT IN BOTTLE

○────────  0%  0 OZ

[<<]   [>>]

*614*

DRUM INFORMATION

| EXPIRATION DATE | FILL DATE | AMOUNT DISPENSED (%) |
|---|---|---|
| 04/01/13 | 03/01/13 | 48 (1.88%) |

```
                          ┌─────────────────────────────────────────── 620
                          │                    DISPENSER        ┌─LOGOUT─┐
                          │                                     └────────┘
                          │  BOTTLE INFORMATION                 ┌─────────┐
                          │  DESCRIPTION      LAST FILL DATE    │CLEAR SCAN│
                          │ ┌16 OZ BOTTLE     03/15/13 4.01PM┐  └─────────┘
                          │ └────────────────────────────────┘
  612 ──┘
                          │         AMOUNT LEFT IN BOTTLE    ┌──┐ ┌───┐  ── 622
                          │  ──────────○──────────           │25%│ │4 OZ│
                          │         ┌────┐       ┌────┐      └──┘ └───┘
  624 ──┘                 │         │ << │       │ >> │
                          │         └────┘       └────┘
                          │                  DRUM INFORMATION
                          │  EXPIRATION DATE     FILL DATE      AMOUNT DISPENSED (%)
                          │     04/01/13          03/01/13          48 (1.88%)
  622 ──┘
```

FIG. 6C

```
                          ┌─────────────────────────────────────────── 680
                          │                    DISPENSER        ┌─LOGOUT─┐
                          │                                     └────────┘
                          │  BOTTLE INFORMATION                 ┌─────────┐
                          │  DESCRIPTION      LAST FILL DATE    │CLEAR SCAN│
                          │  16 OZ BOTTLE     03/15/13 4.01PM   └─────────┘
                          │
                          │  DISPENSE FLUID FROM SELECTED DRUM INTO SELECTED BOTTLE. ── 682
                          │  FILL TO THE 1-1 (16 OZ) LINE, THEN TAP >>
                          │
                          │         ┌────┐       ┌────┐
                          │         │ << │       │ >> │
                          │         └────┘       └────┘
                          │                  DRUM INFORMATION
                          │  EXPIRATION DATE     FILL DATE      AMOUNT DISPENSED (%)
                          │     04/01/13          03/01/13          48 (1.88%)
  622 ──┘
```

FIG. 6D

DISPENSER      LOGOUT

BOTTLE INFORMATION
DESCRIPTION     LAST FILL DATE     CLEAR SCAN
16 OZ BOTTLE     03/31/31 2:07PM

CONFIRM AMOUNT DISPENSED, THEN TAP >> TO SAVE.

DISPENSED AMOUNT
———————○    [100%] [16 OZ]

[<<]      [>>]

DRUM INFORMATION
EXPIRATION DATE     FILL DATE     AMOUNT DISPENSED (%)
04/01/13     03/01/13     48 (1.88%)

DISPENSER      LOGOUT

BOTTLE INFORMATION
DESCRIPTION     LAST FILL DATE     CLEAR SCAN
16 OZ BOTTLE     03/31/13 4:01PM

DISPENSE IS COMPLETE. TAP >> TO CONTINUE.

[<<]      [>>]     REFILL ADDITIONAL BOTTLE/CART

DRUM INFORMATION
EXPIRATION DATE     FILL DATE     AMOUNT DISPENSED (%)
04/01/13     03/01/13     49 (2.44%)

| | DISPENSER | | CLEAR ALL |
|---|---|---|---|
| ☐ REFILL | | | UPDATE ALL |
| ☐ HANDHELD LOGIN | | | |
| ☐ WASTE AMOUNT | 662 | | |
| ☐ DISPENSE | | | |
| ☐ DRUM SCANNED | | | EXPORT |
| ☐ WASTE AMOUNT | | | |

664

| SENSOR ID | SKU DESCRIPTION | EVENT | EVENT DATE |
|---|---|---|---|
| 69177 | 32OZ BOTTLE | REFILL | 03/31/13 4:26PM |
| 34133 | 25 GAL DRUM | DRUM SCANNED | 03/31/13 4:26PM |
| 25798 | 16 OZ BOTTLE | DISPENSE | 03/31/13 4:26PM |
| 64332 | HAND DISPENSER | WASTE AMOUNT | 03/31/13 4:26PM |

*FIG. 6G*

MATERIAL TRACKING SYSTEM

CROSS-REFERENCE TO RELATED APPLICATIONS

This application claims the benefit of U.S. Prov. Appl. 61/835,892, filed 17 Jun. 2013, which is incorporated herein by reference in its entirety.

FIELD OF THE DISCLOSURE

This disclosure relates generally to a method and apparatus for tracking disinfectant materials that have a limited effective life span, such as hypochlorous acid, used in sites such as healthcare facilities and schools.

BACKGROUND

Hypochlorous acid (HOCl) is a weak acid that has many characteristics that can be utilized for beneficial purposes. One such beneficial characteristic is that hypochlorous acid is a highly effective disinfecting agent that kills many types of dangerous infectious bacteria and viruses. Although the human body produces hypochlorous acid to fight infections, hypochlorous acid can also be artificially synthesized.

While it is highly effective at destroying bacteria and viruses that are harmful or deadly to humans such as *E. Coli*, MRSA (Staph), Salmonella, Tuberculosis, HIV, and SARs, hypochlorous acid is also relatively harmless to humans at its typical effective disinfectant concentrations and is therefore safe to use in facilities such as hospitals, nursing homes, and schools. Current disinfectants used by these types of facilities are not as effective as hypochlorous acid, and it is not uncommon for patients and visitors to contract serious illnesses from the bacteria and viruses at these facilities. The inability to effectively combat the infectious organisms that are present in these facilities increases healthcare costs and creates physical harms to patients that are easily preventable by using more effective disinfectants such as hypochlorous acid.

Although hypochlorous acid is highly effective as a disinfectant, its effectiveness has a limited duration. Hypochlorous acid owes much of its effectiveness as a disinfectant to its oxygen atom. The oxygen atom is responsible for oxidizing and destroying the cell walls of microorganisms. However, over time, hypochlorous acid decomposes to chloric acid, hydrochloric acid, and oxygen, none of which exhibit the same desirable disinfectant properties as hypochlorous acid. The typical effective period for hypochlorous acid as a disinfectant may be around 30 days from the time it is produced. Therefore, time-tracking hypochlorous acid used in a hospital or any similar setting where this highly effective disinfectant is utilized becomes crucial in maintaining and ensuring sterile environments.

Additionally, to be used in hospitals or settings that require a sterile environment, disinfectant processes must typically be substantiated by governmental agencies such as the Environmental Protection Agency (EPA) or Food and Drug Administration (FDA). Due to the time-critical factor of the effectiveness of hypochlorous acid, these agencies would only be likely to substantiate processes that utilize hypochlorous acid as a disinfecting agent if the process included an accurate mechanism for validating that any material used is within its effective period. This becomes a complicated process as these materials may be delivered to a facility in a container having a relatively large volume and may then be dispensed into many containers having smaller volumes for use. Accordingly, validating the effectiveness of any material used involves tracking the contents of a large number of containers. There is therefore a need in the art to overcome these difficulties in order to track highly effective disinfectants having a limited lifespan, such as hypochlorous acid.

SUMMARY OF THE DISCLOSURE

A monitoring and distribution system is used for a disinfectant having an expiration, meaning that the disinfectant has a limited duration of effectiveness, an expiration date, an effective period, a designated shelf life, or the like. The system has identifiers, at least one reader, at least one database, and processing equipment. The identifiers are associated with containers that each has a volume for dispensing the disinfectant. The at least one reader reads the identifiers, and the at least one database associates the volume and the expiration of the disinfectant contained in each of the containers. The at least one database can further associate locations with the containers.

The identifiers can include a Radio Frequency Identification tag, a bar code, a quick response (QR) code, a magnetic strip, a near field communication element, an optical element, and an electromagnetic element. In a similar fashion, the at least one reader can include a Radio Frequency Identification (RFID) reader, an optical scanner, a barcode reader, a Quick Response (QR) code reader, a magnetic strip reader, a near field communication device, an optical device, and an electromagnetic device.

The processing equipment is operatively coupled to the at least one reader and the at least one database, and the processing equipment tracks each of the volume of the disinfectant, the expiration of the disinfectant, and the identifiers of the containers. For example, the processing equipment can include one or more of a server, a computer, a tablet, a laptop computer, a kiosk, a cellular phone, a smart phone, or the like. Depending on the configuration, the processing equipment can include a local processing unit at a facility and may further include a remote processing unit operatively coupled to the local processing unit via a network connection.

To track each of the volume of the disinfectant, the expiration of the disinfectant, and the one or more containers, the processing equipment is configured to log the dispensed amount of the disinfectant to the identifier of a given container and can associate the expiration of the dispensed amount with the identifier for the given container. Additionally, the processing equipment can log disposal of an amount of the disinfectant from the volume of a given one of the containers.

To track of each of the volume of the disinfectant, the expiration of the disinfectant, and the identifiers of the containers, the processing equipment can further be configured to track treatment of a location with the disinfectant from a given one of the containers. For example, the at least one reader can include a reader reading information of the location for associating with the tracked treatment. The processing equipment can then associate, with the tracked treatment, information about the treatment, which can include one or more of a type of the treatment performed, a user performing the treatment, and a time of the treatment.

To further track, the processing equipment is configured to execute rules, such as generating an alert when at least one of the containers contains the disinfectant past the expiration, automatically disposing of the disinfectant from the at least one container containing the disinfectant past the expiration, and instructing the manual disposal of the disinfectant from the at least one container containing the disinfectant past the expiration.

In the system, the containers can include a distribution container that is filled with the disinfectant at a source and transported to a facility for dispensing, and the containers can include a use container that is filled with the disinfectant from the distribution container for dispensing at the facility. For example, the use container can be a spray bottle, an electrostatic sprayer, a hand-sanitizer dispenser, a disinfectant container, a sanitation container.

In a method of monitoring and distributing a disinfectant having an expiration in a location, at least one first identifier associated with at least one distribution container is obtained. For example, the at least one identifier can be read with at least one reader. The at least one distribution container stores a first volume of the disinfectant, and first information of the first volume and of the expiration of the disinfectant is stored in at least one database based on the at least one first identifier. This first information can be obtained from a remote source via a network connection.

In the method, one or more second identifiers associated with one or more use containers are also obtained. For example, the one or more second identifiers can be read with the at least one reader. To read the identifiers, at least one Radio Frequency Identification (RFID) reader can electronically read RFID tags associated with the use containers when positioned in proximity to the at least one RFID reader.

Second information is stored in the at least one database for the one or more use containers. The second information includes one or more second volumes of the disinfectant distributed to the one or more use containers from the first volume of the at least one distribution container and of the expiration of the disinfectant distributed.

In the method, each of the first and second volumes of the disinfectant, the expiration of the disinfectant, the at least one distribution container, and the one or more use containers is tracked with processing equipment using the first and second information. To track the information, the processing equipment tracks distribution of the first volume to the one or more second volumes and updates the stored first and second information. The method can further involve metering the distribution of the disinfectant from the first volume to the one or more second volumes.

To track the information, the processing equipment can determine that the at least one distribution container contains at least a portion of the first volume past the expiration date and can determine that at least one of the one or more use container contains at least a portion of the second volume past the expiration date. The processing equipment can further determine that the first volume of the at least one distribution container has been depleted and can track disposal of an amount of the dispensed second volume of the disinfectant not used.

To track the information, the processing equipment can track treatment of a location with the disinfectant from a given one of the one or more second containers. For example, information about the location can be obtained and associated with the given second container. To obtain the information about the location, the method may involve reading, with at least one reader, the information at the location. To further track the treatment of the location, information about the treatment can be obtained and associated with the given second container. This treatment information can include one or more of a type of the treatment performed, a user performing the treatment, and a time of the treatment.

The foregoing summary is not intended to summarize each potential embodiment or every aspect of the present disclosure.

BRIEF DESCRIPTION OF THE DRAWINGS

FIG. 6A-6G are example user interface screens for a processing unit of the disclosed system.

DETAILED DESCRIPTION

Figure 1:
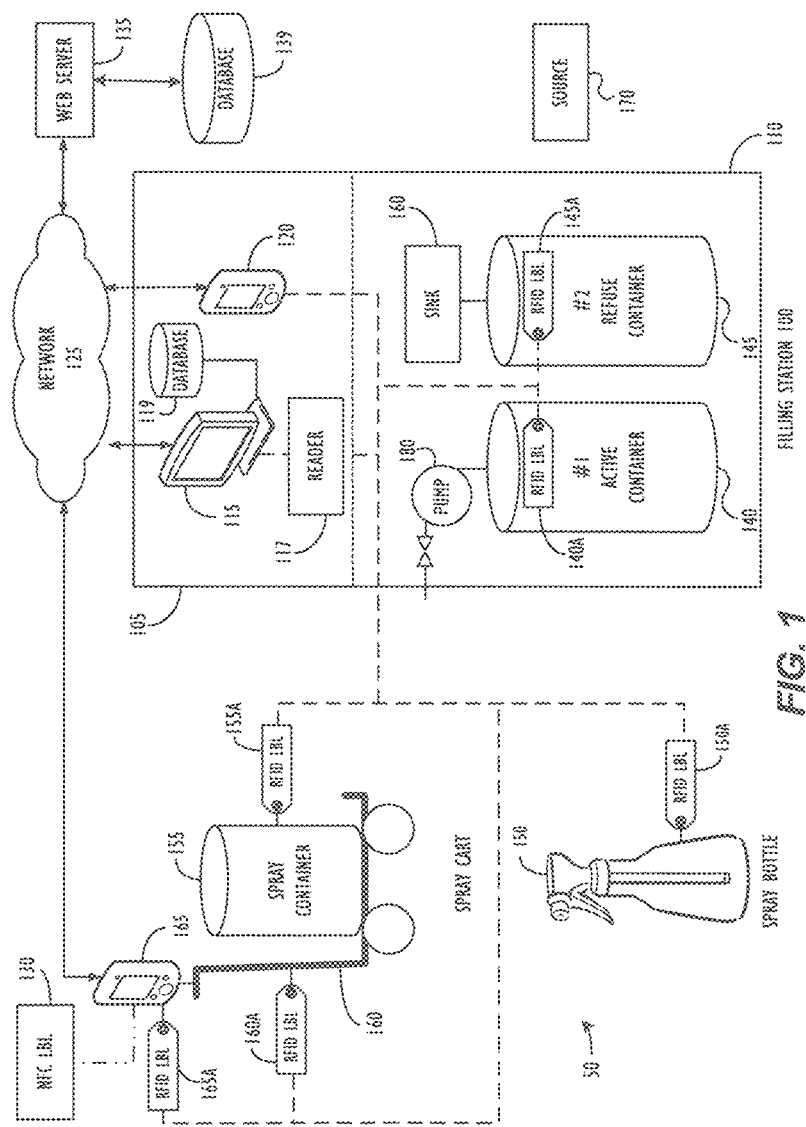
FIG. 1 is a block diagram of a system for tracking a disinfectant from its time of production through its time of use.

Referring to FIG. 1, a system 50 according to the present disclosure tracks a material that has an expiration from the time of manufacture. In general, the material can be a liquid, solid, or gas composition that degrades or otherwise loses its effectiveness, expires, or spoils within a particular time span from its point of production or manufacture. As such, the material has an expiration, meaning that the material has a limited duration of effectiveness, an expiration date, an effective period, a designated shelf life, or the like. For the purposes of discussion, the term "expiration date" may be used for convenient. As noted herein, one particular material suited for the disclosed system 50 includes Hypochlorous acid (HOCl), although other disinfectants, agents, natural or man-made materials can benefit from the system 50 of the present disclosure. Indeed, it is even contemplated that the disclosed system 50 can be used with produce, food products, beverages, juice, milk, water, and any other material that is dispensed and has an expiration.

The system 50 includes a filling or distribution station 100, a local control unit 105, a remote control unit 135, various containers 140, 145, 150, and 155, and other components. The filling station 100 and the local control unit 105 are housed in a facility requiring disinfection, such as a hospital, a nursing home, a dormitory, a school, etc. Distribution containers 140 of the expirable disinfectant are delivered to the facility from source locations 170 and are stored at the filling station 100. The dispensing, use, and expiration of the disinfectant is monitored by the local control unit 105, and the remote control unit 135 operates in conjunction with the local control unit 105 to monitor the delivery and use of the disinfectant and operates in conjunction with the source 170 or manufacturer of the disinfectant.

At the facility, the filling station 100 serves as a point of distribution from a distribution container or drum, such as container 140, allowing users to fill and use various dispensing containers, such as spray bottles 150, cart-transported sprayers 155 (e.g., electrostatic sprayers), hand-sanitizer dispensers, and other devices to disinfect and sanitize the facility. The users can be cleaning personnel, janitors, maids, nurses, doctors, etc.

In the illustrated embodiment, the filling station 100 includes both the local control unit 105, which may include a processing unit and a user interface, and includes a distribution portion 110. Accordingly, the filling station 100 and the local control unit 105 may be implemented as a kiosk or other integrated unit.

The local control unit 105 serves as a user interface to the filling station 100 and to the system 50 as a whole. The local control unit 105 may include a computer 115, which can include a user display and peripherals such as a keyboard, mouse, touchscreen monitor, or other input and output devices for interacting with the users and other parts of the system 50. The computer 115 includes a connection to a network 125 that enables system functionality (described in greater detail below). The network connection may take any form including, but not limited to, a local area network (LAN), a wide area network (WAN) such as the Internet or a combination of local and wide area networks. Moreover, the network 125 may use any desired technology, or combination of technologies (including, but not limited to, wired, wireless, cellular, or a combination thereof) and protocol (e.g., transmission control protocol, TCP).

The local control unit 105 further includes a reader 117 operatively coupled to the computer 115. The reader 117 actively reads information associated with the various containers 140, 145, 150, 155, etc. used to dispense and hold the disinfectant. Various types of reader 117 can be used, including, but not limited to, a Radio Frequency Identification (RFID) reader, a scanner, a barcode reader, a Quick Response (QR) code reader, or other optical or electromagnetic device. For the purposes of the present disclosure, the reader 117 is referred to as an RFID type of reader for reading RFID tags, labels, and the like. This is meant to provide an example for the purposes of description and is not intended to be limiting.

The local control unit 105 may additionally include a mobile locator device 120, such as a handheld scanner or reader. While the mobile locator device 120 may typically be docked at the filling station 100, it may be removed from the filling station 100 in order to detect a use or distribution container 150, 155, etc. when necessary as will be described in greater detail below. The mobile locator device 120 may be a mobile device, such as a personal digital assistant, a tablet computer, a mobile telephone, or any other similar device and may execute a software application that provides certain system functionality. Like the computer 115, the mobile locator device 120 may be connected to the network 125. Similarly, the mobile locator device 120 may include a reader (not shown), such as a radio frequency identifier (RFID) transceiver.

In the illustrated embodiment, the distribution portion 110 of the filling station 100 includes locations and plumbing connections for two distribution containers 140 and 145. The first distribution container 140 is an active filling container that contains effective disinfectant (i.e., material within its effective expiration date) and is used to fill use containers (e.g., use containers 150 and 155).

The other distribution container 145 is a refuse container used to collect residual disinfectant from use containers 150, 155 through a filling station sink 160. This refuse container 145 may also receive expired disinfectant directly from the active filling container 140. Accordingly, there may be a plumbing connection (not shown) between the two distribution containers 140 and 145 to enable the transfer of expired disinfectant from the active filling container 140 to the refuse container 145 prior to replacing active container 140 with a new container. Of course, the distribution portion 110 can have more than one active container 140 for dispensing the disinfectant.

As shown in FIG. 1, the distribution portion 110 may additionally include instrumentation for managing the materials. For example, the distribution portion 110 may include flow and level measurement devices (not shown) and transfer devices (e.g., pumps 180) for automatically measuring and transferring disinfectant from the distribution container 140 to the use containers 150, 155.

To track and monitor the use and distribution of the disinfectant, each distribution container (e.g., 140 and 145) and each use container (e.g., 150 and 155) includes coded information in a tag, label, or the like affixed to (or otherwise associated with) the container. In the present example, each of the containers 140, 145, 150, 155 has an attached RFID label that uniquely identifies the container. As is known by those of ordinary skill in the art, RFID labels allow for the wireless transmission of data over relatively short distances. The RFID labels that are attached to the distribution and use containers (e.g., labels 140A, 145A, 150A, and 155A) may be active RFID tags (powered by a local power source (e.g., a battery)), or they may be passive RFID tags (utilizing the electromagnetic signals emitted by the transceiver as power to respond with their unique identifier).

Figure 2A:
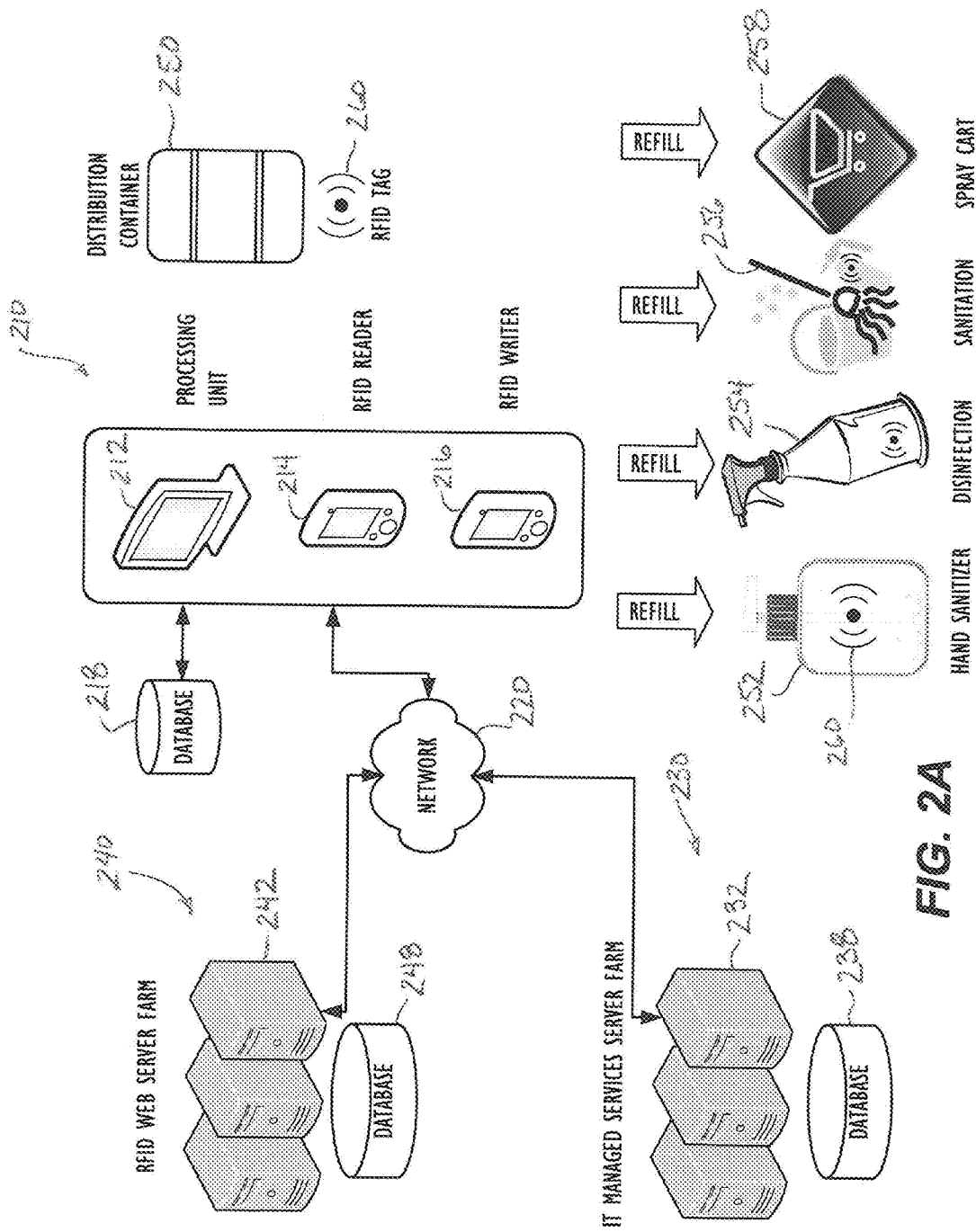
FIG. 2A schematically illustrates a configuration of the system in which equipment at a facility is connected via a network connection to remote services.
Figure 2B:
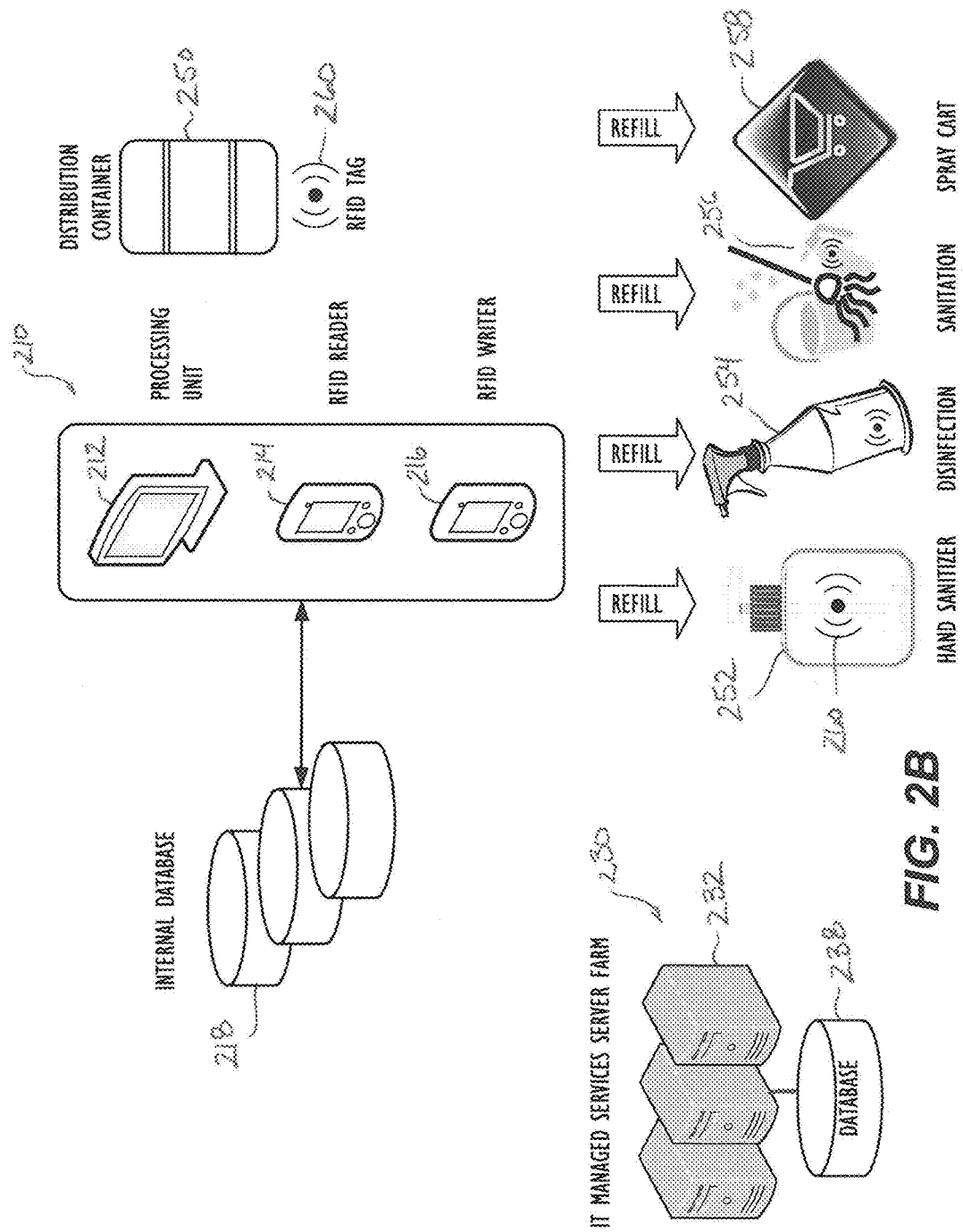
FIG. 2B schematically illustrates a configuration of the system in which the equipment at the facility is not connected via a network connection to remote services.

As will be set forth below, the local control or processing unit 105 of the filling station 100 may execute an application that utilizes the RFID labels 140A, 145A, 150A, etc. to track the location of the disinfectant from the production of the disinfectant at its source 170 through its use at the facility. In one embodiment, the application may be executed as a web-based application with some portion of the program code executing remotely from filling station 100 (e.g., at the web server 135). For example, a database 139 may reside on a web server 135 (or another network device including a database 119 of the personal computer 115) to track the current status of all system distribution and use containers and to track the expiration of the disinfectant those containers have. (FIGS. 2A-2B show arrangements for tracking disinfectant and containers from manufacture through use at a facility.)

The functionality of the disclosed tracking system 50 will now be described by reference to examples from a typical lifecycle for a particular volume of the disinfectant. Initially, the disinfectant, such as hypochlorous acid, is produced at a source 170—i.e., a production/distribution facility. A batch of the disinfectant may be associated with certain properties (e.g., a batch number, a production date, results of standard lab analyses of sample material from the batch, expiration, etc.). An empty distribution container 140 is filled with the newly produced material. The transfer of disinfectant to the distribution container 140 may be performed at a filling station similar to the filling station 100 located at the local facility. (FIG. 3 below discloses a process for filling a distribution container with disinfectant.)

To perform a filling operation, a user may log in through the interface portion of such a filling station 100. In one embodiment, logging in to the filling station 100 may require the entry of a user name and password such that the user may be authenticated. Based on this required authentication, all filling station events may be associated with a particular user. The user may then select an option to initiate the filling operation. In response, the filling station 100 uses the reader 117 to locate any RFID labels 140A that are within communication range. If one or more RFID labels 140A are identified, the user may be asked to select the container 140 that is to be filled from a list of the identified containers 140. For example, the user may read a label 140A from the container 140 and identify a matching label from a list of labels corresponding to the identified RFID labels. In the unusual event that no RFID label is identified by the filling station 100, the user may be prompted to resituate the container 140 such that the RFID label may be identified. If a label is not identified for the container 140 or if the container 140 or label 140A is not recognized, then the user is not instructed to fill the container 140.

Once the container 140 has been selected, the user is prompted to connect the container 140 to begin the filling operation. In one embodiment, the filling station 100 may present an illustration of the necessary plumbing connection(s) to begin the filling operation. Once the connections have been made, the filling operation may be commenced through the filling station interface.

In one embodiment, the system 50 may retrieve known properties for the container 140 (i.e., based on the identified RFID label) in order to perform the filling operation. For example, the identified RFID label may be utilized to search one or more databases 119 and/or 139 that contain information for containers (both use and distribution) that are managed by the system 50. The database 139 may be located on a remote device such as the web server 135, and/or the database 119 may be located locally. Using the retrieved properties (e.g., container volume), the filling operation may be performed automatically.

Upon completion of the filling operation, the user may be prompted to disconnect the container 140. The filling station 140 then records the filling operation as a system event, which is then associate the dispensed disinfectant in the container 140. For example, the database 119, 139 can be updated to reflect the properties (e.g., manufacture date, results of lab analyses, expiration date, etc.) of the disinfectant in the distribution container 140.

Now that the container 140 is filled, the source 170 delivers the container 140 to its intended use location (e.g., a hospital, a school, a nursing home, etc.). (FIG. 4 below discloses a process for receiving a distribution container at a facility.) In one embodiment, if the distribution container 140 is not to be immediately placed into use in a filling station 100 at its use location, the mobile locator device 120 of the filling station 100 at the use location can be utilized to detect the arrival of the container 140 at the use location. The arrival of the container 140 at the use location is also recorded as a system event. For example, the mobile device 120 may, upon identifying the RFID label 140A of the delivered container 140, update the local database 119 and may update the remote database 139 via the connection to the network 125. A similar operation may be performed when a distribution container 140 is returned to the production/distribution source 170 so that the location of all system containers 140 can be monitored at any point in time.

After the container 140 has been delivered to its destination, it is used to replace an empty or expired active filling container 140 in the filling station 100. In order to replace the empty or expired container 140, a user logs into the filling station's local control unit 105 and selects an operation to replace the active container 140. In one embodiment, any remaining material in the active filling container 140 may be transferred to the refuse container 145, and the user may be prompted to transfer the remaining material to the refuse container 145. In another embodiment, the remaining material may be automatically transferred to the refuse container 145. For example, in response to the user request to initiate the exchange operation, the local control unit 105 of the filling station 100 may open valves and/or start a pump 180 to transfer the material via a connection between the containers 145 and 145. Because the current filling container will become the new refuse container, removing any remaining contents will enable the container to accept its full volume in disposed fluids.

When the new container 140 is brought into proximity of the reader's range, the local control unit 115 attempts to identify the RFID label 140A for the new distribution container 140 via the reader 117 (e.g., RFID transceiver). Like the filling operation described above, if one or more RFID labels are identified, the filling station 100 may prompt the user to verify the identity of the new distribution container 140 by selecting a label that is printed on the new distribution container from a list of labels corresponding to the identified RFID labels. In one embodiment, based on the known and previously acknowledged identifiers of the existing distribution containers 140 in the reader's range, their labels may be excluded from the list.

After the new distribution container 140 is identified, the filling station 100 can verify that the new distribution container 140 contains effective material. For example, the filling station 100 can query the database 119, 139 for the properties of the disinfectant in the identified container 140. If the disinfectant in the new distribution container 140 is effective (i.e., the current date is prior to the material's expiration date), the user may be prompted to disconnect the existing distribution containers, to connect the existing active filling container as the refuse container, and to connect the new distribution container 140 as the active filling container. If the disinfectant in the new distribution container 140 is not effective, the user may be prompted to obtain a different distribution container that contains effective material.

The filling station 100 may also prompt the user to send the old refuse container back to the distribution source 170. In one embodiment, these instructions implemented by the local control unit 105 may be site specific. For example, the user may be prompted to move the old refuse container to a particular site location designated for pickup and transportation back to the distribution source 170.

Using the known identifiers of the previous distribution containers and the identified RFID label 140A for the new active filling container 140, the filling station 100 records the events. Recording the events may include updating the database 119, 139 to reflect the new status for each of the distribution containers. In one embodiment, the filling station 100 may also schedule one or more future events. For example, based on the known properties of the disinfectant in the new active filling container 140, an alert may be scheduled to occur on or near the expiration date of the material in the new active filling container 140 if it is still being used as an active filling container 140 on the expiration date (or some time period prior to that date).

Now that the filing station 100 has disinfectant, the station 100 can be used to dispense the disinfectant from the active filling container 140 to the various use containers 150 or 155. To do this, a user logs in to the filling station 100 and select a dispense operation from the interface. (FIG. 5 below discloses a process for filling a use container with disinfectant.) In response to the selection, the filling station 100 attempts to identify any RFID labels for spray bottles 150 or cart-mounted spray tanks 155 that the user brings to the reader 117. In one embodiment, the cart 160 and a near field communications (NFC) reader, another RFID reader, or other type of reader 165 may additionally have RFID labels 160A and 165A, respectively, that can be read to associate the use container 155 with these devices at the time of a dispense operation.

Just as with the previous operations, if one or more RFID labels are detected, the user may be prompted to verify a label printed on the use container 150, 155 to be filled by selecting the label from a list of labels corresponding to the identified RFID labels. In one embodiment, because the system 50 is aware of the type of container 150, 155 associated with each RFID label, the labels for distribution containers 140 are excluded from the list. Once the use container 150, 155 has been identified and selected, the user is prompted to specify the volume of disinfectant that remains in the use container 150, 155, and, if any disinfectant remains, to dispose of the remaining disinfectant in the filling station sink 160 for the refuse container 145.

The user is then prompted to connect the use container 150, 155 to the active filling container 140. In one embodiment, the use container 150, 155 may be filled automatically. For example, the volume of the use container 150, 155 is retrieved using the RFID label of the use container 150, 155, and the appropriate volume is transferred from the active filling container 140 to the use container 150, 155 using the various pumps 180, valves, and the like of the filing station 100. Alternatively, the user is prompted to manually fill the use container 150, 155.

After the use container 150, 155 is filled, it is disconnected from the active filling container 140. The system 50 then records the filling of the use container 150, 155 as an event. Recording the event includes updating the database 119 and/or 139 to reflect the contents of the filled use container 150, 155, the amount of disinfectant dispensed to that container 150, 155, the expiration date of the dispensed disinfectant in that container 150, 155, and the association of the use container 150, 155 with other devices (e.g., cart 160 and NFC reader 165). In other words, because the system 50 is aware of the properties (e.g., a batch number, a production date, results of standard lab analyses of sample material from the batch, expiration, etc.) of the disinfectant in the active filling container 140, these properties can be transferred to the filled use container 150, 155.

The system 50 can also schedule future events based on the filling operation. For example, an alert can be created to occur on the expiration date of the material if the use container 150, 155 has not been returned for refill prior to that date. In one embodiment, when an alert is generated indicating that a use container 150, 155 contains material that is beyond its effective date, a user may be prompted to use the mobile locator device 120 to locate the use container 150, 155 and bring it to the filling station 100 to empty the expired contents.

As noted above, recording the filling operation can also include recording a transferred volume. In one embodiment, the transferred volume is based on a measured amount of transferred material (e.g., measured using a flow measurement device or using a measured volumetric change in the active filling container 140). In another embodiment, the volume is estimated based on the known properties of the filled use container 150, 155. In either case, the recorded volume transferred in accordance with the filling operation can be used to track the actual yields of the active filling container 140 against its expected yield (e.g., by creating reports or alerts associated with the yield).

The utilization of a particular use container 150, 155 to perform a treatment in the facility can also be tracked by the system 50. In the embodiment illustrated in FIG. 1, the cart-mounted spray tank 155 is associated with an NFC reader 165, although the reader 165 can be another RFID reader, an optical reader, or any other type of reader as disclosed herein. NFC reader 165 may be a mobile device such as a personal digital assistant, a tablet computer, a mobile telephone, or any other similar device and may be connected to the network 125 (e.g., via a wireless network connection). The NFC reader 165 can be attached to the spray cart 160 and can be removable so the NFC reader 165 can be used to read an NFC label 130 to indicate the performance of a treatment. In one embodiment, the NFC reader 165 is connected to the spray cart 160 via a retractable connector that allows the NFC reader 165 to be placed in close proximity to the NFC label 130. For its part, various NFC labels 130 can be mounted in areas that are commonly treated (e.g., hospital rooms, etc.) and can uniquely identify the area in which they are mounted so that performance of tasks related to these areas can be monitored by the system 50. In this way, the system 50 can track which dispensed material, along with its expiration date, source information, etc., was used to clean an area of the facility and can track what task (e.g., type of treatment) was performed. Additional information associated with the user, the equipment, time, date, and the like can also be correlated with these details.

For example, prior to treating a monitored area, a user places the NFC reader 165 associated with the use container 155 that will be used to treat the area in close proximity to the NFC label 130 for the area to be treated. In addition, the user may be required to enter user authentication credentials through the NFC reader 165. The system 50 may only allow an NFC reader 165 to be "scanned in" to a single location at any time. That is, once an NFC reader 165 has been used to signify the beginning of a treatment at a particular area, the reader 165 must be used to signify the end of the treatment of that area before the reader 165 can be used at another area.

Because the NFC reader 165 is associated with the use container 155, it can be determined whether the material in the use container 155 is effective. If the disinfectant is not effective, the user may be prompted to return to the filling station 100 to obtain effective disinfectant. If the disinfectant is effective, the user may be prompted to perform the treatment. The use container 155 can then be utilized to dispense the disinfectant in the monitored area (e.g., using an electrostatic spray device).

After the treatment has been performed, the user again brings the NFC reader 165 into close proximity of the NFC label 130 to signify completion of the task. The NFC reader 165 may transmit information via the network 125, and the system 50 may then record a use event that associates the area treated with the user that performed the treatment, the use container 155 used to perform the treatment, and the properties of the material in the container 155 used to perform the treatment.

In one embodiment, recording the use event may include marking a scheduled task (e.g., a task to treat a certain area) as complete. In such an embodiment, credit may only be given for the completion of a task when the proper procedures have been followed (e.g., using the NFC reader 165 to record the task) so that the effectiveness of the disinfectant used can be verified.

In another embodiment, credit may only be given for a scheduled task when the use container 155 is returned to the filling station 100. In such an embodiment, credit may only be given where a dispensed volume exceeds a volume associated with the task. For example, if a use container 155 that was recorded as having been used to perform a treatment is returned to the filling station 100 with a residual volume that indicates the dispensed volume was less than an amount required for the performed treatment, the scheduled task may not be marked as complete, and the user may be prompted to perform the task again. In such an embodiment, the material volume associated with the task may be a default volume associated with the particular area. Alternatively, the material volume associated with a task may be adjustable using a system interface. For example, to treat an area that was recently used by a patient having a certain infection, the material volume associated with the task may be increased.

The described system 50 provides a mechanism for ensuring that a disinfectant used to perform a treatment is within its effective period. In addition, because each filling station 100 may be connected to the Internet via the network 125 with at least a portion of the system's functionality implemented as a web application, system monitoring may be performed remotely. For example, using an Internet-connected device, the system 50 may be accessed in order to retrieve desired system statistics. These statistics may be presented in user-created or predefined reports having varying levels of detail.

FIG. 2A schematically illustrates a configuration of the system 200 in which processing equipment 210 at a facility is connected via a network connection 220 to remote services, including a managing source 230 and a tracking source 240. Although shown separate, the managing source 230 and the tracking source 240 may be one and the same entity, but they are described separately for purposes of understanding. The processing equipment 210 at the facility may store information locally in local databases 218 and may upload and download information for storage with the sources 230, 240. Also, the processing equipment 210 may not store at least some forms of information locally and may instead access that information from the sources 230, 240 as needed via the network connections 220.

The managing source 230 has servers 232 and databases 238 and may be responsible for one or more activities, such as manufacturing, ordering, and distributing the expirable disinfectant; billing the facility; and other types of management services. The tracking source 240 also has servers 242 and databases 248. This source 240 may be responsible for activities, such as tracking containers, storing tracked information, monitoring usage and events, etc. Although shown connected to the processing equipment 210 at one facility, these sources 230 and 240 can operate in conjunction with multiple facilities having processing equipment 210.

In this system 200 similar to the activities disclosed above, as containers (e.g., distribution containers 250, hand-sanitizer dispensers 252, disinfection dispensers 254, sanitation dispensers 256, spray carts 258, etc.) are brought to the equipment's reader 214 (e.g., the container's RFID tag 260 is brought within range of the RFID reader 214, the container's barcode 260 is read by the optical reader 214, etc.), the processing equipment 210 detects the container 250-258, and the fluid dispensing process may begin. The processing equipment 210 allows users to refill each container 252-258 and reassign or tag the fluid expiration date associated with the dispensed fluid. When the expiration date on a container 250-258 is met, the processing equipment 210 alerts the users to refill and retag the container 250-258 to ensure the fluid's potency and effectiveness.

As shown, a particular distribution container 250 at the facility having the processing equipment 210 may be nearing its expiration date, and the system 200 monitors the expiration dates of the various containers 250-258 stored in the equipment's local database 218 and/or in one or more remote databases 238, 248. The system 200 sends a communication (e.g., email, text, SMS, etc) to a user and may display a notification window on a user interface screen of a computer, a Kiosk, a tablet, a laptop, or other processing unit 212. To send the communications, the processing equipment 210 may originate the communication, or the tracking source 240 may do this.

The user then orders a new distribution container 250 at the processing unit 212, although other channels for ordering could be used. In turn, the processing unit 212 sends the order request to a source 230, which may or may not be the actual manufacturer of the expirable disinfectant. The source 230 can be a distributor, a service provider, etc. that manages services for the facility.

The source 230 then ships a new distribution container 250 to the facility, and the user eventually receives the new distribution container 250 and replaces any expired distribution container 250 at the facility. Although one distribution container 250 is shown, a facility may have multiple distribution containers and may have multiple stations with processing equipment 210 interconnected via the network 220 or other local connection. Preferably, the processing equipment 210 detects the new distribution container 250 when it is set up at a filling station of the facility or when a user logs the distribution container 250 in at the facility. The processing equipment 210 records its expiration date and fluid levels, among other possible details, such as location, arrival date, manufacturer, etc. Once this is done, the new distribution container 250 is ready for use to dispense the expirable disinfectant.

During use for dispensing, various transportable containers 252-258 are brought to the filling station and the distribution container 250 to obtain expirable disinfectant and to dispose of expired or residual disinfectant. In addition to monitoring the distribution container 250, the system 200 monitors the various containers 252-258 in use, as they are filled, emptied, discarded, etc. For example, the processing equipment 210 determines that a disinfection bottle 254 contains (or is expected to contain) disinfectant nearing its expiration date. The system 200 (e.g., tracking source 240 and/or processing equipment 210) sends a communication (e.g., email, text, SMS, etc.) to the user and displays a notification window on the equipment's processing unit 212.

The user returns the disinfection bottle 254 to the processing equipment 210 and launches a dispenser program on the processing unit 212 to begin a refill operation. The reader 214 of the equipment 210 detects the disinfection bottle 254, and the processing unit 212 instructs the user to dispose of expired disinfectant (if any) and dispense new disinfectant into the container 254. The processing unit 212 records how much disinfectant is disposed of and dispensed with, and the processing unit 212 updates the databases 218, 238, 248 (locally and/or remotely) with a new expiration date for the container 254 and its newly dispensed contents. For example, the disposal of the old disinfectant and the dispensing of the new disinfectant are saved as events to the unit's internal database 218, and the events are also sent in separate or batch uploads to the tracking source's database 248 via the network connection 220.

In some implementations, the processing equipment 210 at the facility may be unconnected to the various remote sources 230 and 240. For example, FIG. 2B schematically illustrates a configuration of the system 200 in which the processing equipment 210 at the facility is not connected via a network connection to remote services. As before, when containers 250-258 are brought to the equipment's reader 214, the processing unit 212 detects the container 250-258 so the fluid dispensing process may begin. Again, the processing unit 212 allows the user to refill each container 250-258 and retag the fluid expiration date. When the expiration date on a container 250-258 is met, the processing unit 212 alerts the user to refill and retag the container 250-258 to ensure the fluid's potency and effectiveness.

During the course of operation, the currently used distribution container 250 may be nearing its expiration date. The processing unit 212 sends a communication (e.g., email, text, SMS, etc.) to the user and displays a notification window on the unit's user interface. The user then orders a new distribution container 250 through other channels. When the order is received by the managing source 230, a new distribution container 250 is shipped to the facility. The user receives the new distribution container 250 and replaces the expired distribution container 250. The processing unit 212 detects the new distribution container 250, and the user enters the expiration date and fluid levels, among other possible details. At this point, the new distribution container 250 is ready for use.

During use for dispensing, various transportable containers 252-258 are brought to the filling station to obtain expirable disinfectant and disposed of expired disinfectant. The processing unit 212 monitors the various containers 252-258 in use, as filled, as emptied, etc. For example, the processing unit 212 determines that a disinfection container 254 is nearing expiration date. The processing unit 212 sends a communication (e.g., email, text, SMS) to the user and displays a notification window on the unit's user interface. The user returns the container 254 to the filing station and launches a dispenser program on the processing unit 212 to begin refill. The processing unit 212 detects the returned container 254, and instructs the user to dispose of the expired fluid and dispense new fluid. The processing unit 212 records how much fluid is disposed and is dispensed and updates the local database 218 with a new expiration date. Being untethered from monitoring services, the processing unit 212 saves the various events and other tracking information to the unit's internal database 218.

Figures 3, 4:
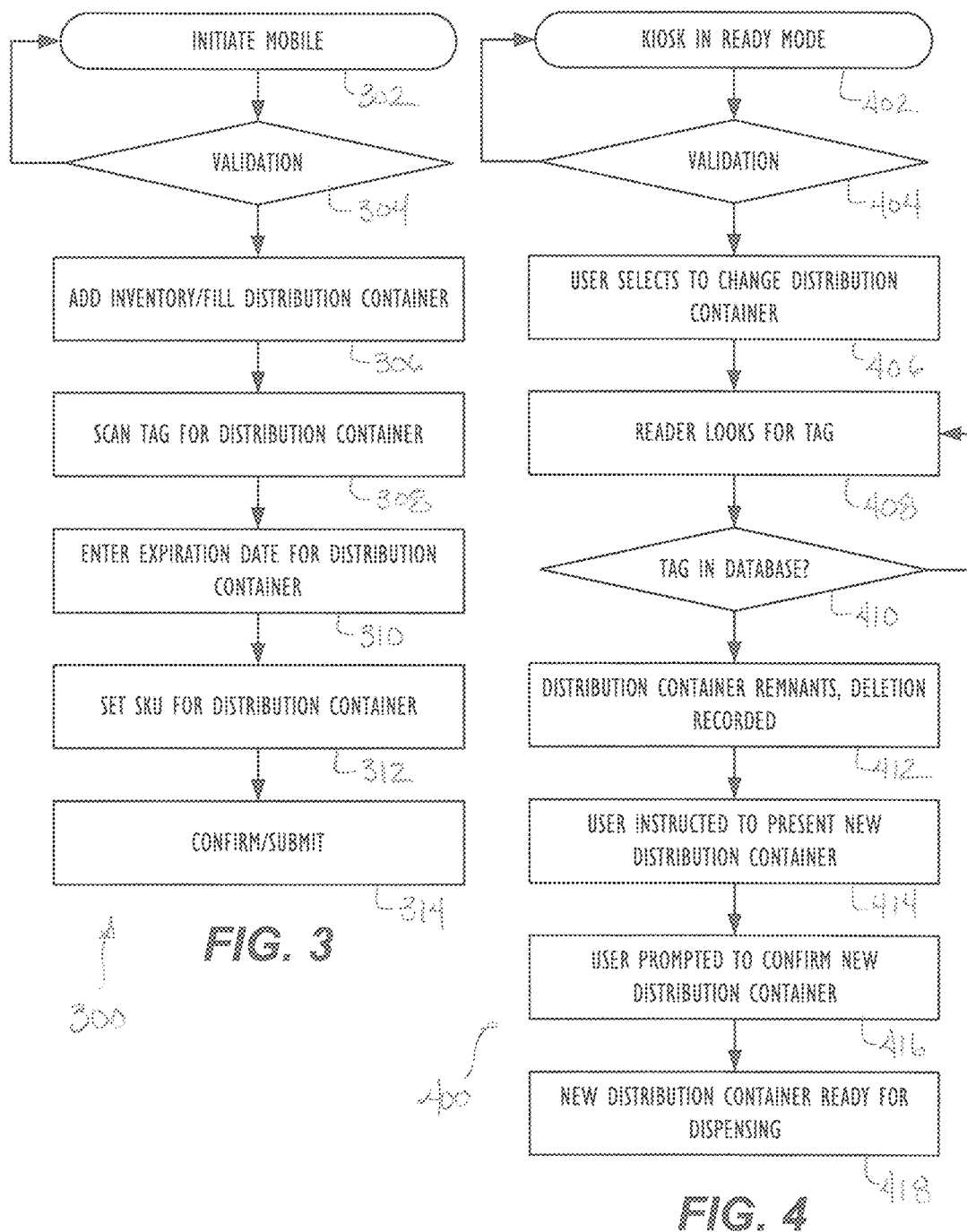
FIG. 3 is a flow chart of a process for tracking a disinfectant from its time of production through its time of use.
FIG. 4 is a flow chart of a process for a user to add or replace distribution containers of the disinfectant at a facility.

As noted above, tracking the disinfectant involves entering tracking information at a source when filling a distribution container with new disinfectant. As an example, FIG. 3 shows a process 300 for filling a distribution container (250) with disinfectant at a source (e.g., managing source 230) and recording its details for later tracking. The process initiates, and a validation step is performed (Blocks 302-304). The user selects to add inventory and fill a new distribution container (250) with the expirable disinfectant (Block 306). The tag for the distribution container (250) is scanned (Block 308). For example, an RFID tag for the distribution container (250) can be scanned. The tagged information may be coordinated with the tracking source (240) if a separate entity.

An expiration date for the new disinfectant is entered into the system (200) (Block 310). The user then sets the stock keeping information (e.g., SKU) for the distribution container (250), indicating the type of container, its volume, its ingredients, its batch number, etc. Finally, the user confirms and submits the entered information for the distribution container (250) so that it can be shipped out to a facility to fill an order (Block 314).

As noted above, tracking the disinfectant involves entering tracking information at a facility when receiving a new distribution container. As an example, FIG. 4 shows a process 400 of a user replacing an old distribution container (250) with a new distribution container (250) at a facility. While the processing unit (212) is in ready mode, the user enters access details, and the process goes through a validation step (Blocks 402-404). The user selects to change the distribution container, and the reader looks for the tag associated with distribution container in the vicinity of the processing unit (212) that has been used to dispense disinfectant (Blocks 406-410). The processing unit (212) continues to scan for a nearby tag with information stored in the database. When the distribution container (250) is scanned, the processing unit (212) prompts the user to enter what percentage of the distribution container still contains unused disinfectant (Block 412). To maintain consistency in the material disposed, the processing unit (212) instructs the user to dispose of the unused disinfectant.

The user is instructed to present a new distribution container (250) with new disinfectant (Block 414), which is scanned as noted herein. Once the new distribution container (250) is detected or logged, the user is prompted to confirm the new distribution container (250) (Block 416). Once these steps are completed, the new distribution container (250) is ready for dispensing (Block 418).

Figure 5:
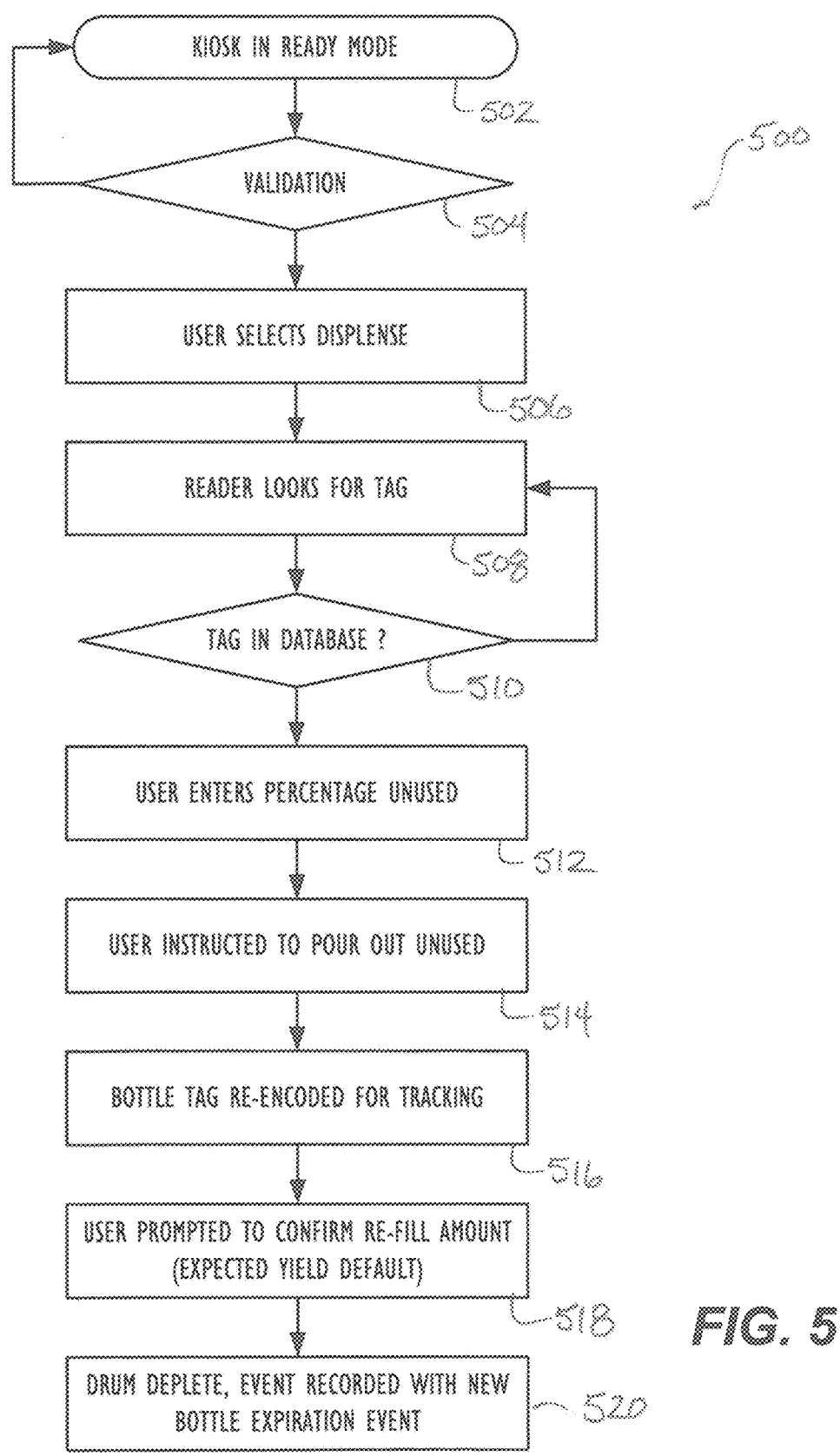
FIG. 5 is a flow chart of a process for a user to empty the container of expired disinfectant, refill the container with a new disinfectant and record onto the identifier of a given container a new expiration date.

As noted above, tracking the disinfectant involves entering tracking information at a facility when filling user containers with disinfectant. As an example, FIG. 5 shows a process 500 of a user filling a use container (252-258) at a facility with disinfectant. While the processing unit (212) at the facility is in ready mode (Block 502), the user enters access details, and the process goes through a validation step (Block 504). Having a use container to be used for disinfecting, the user selects to dispense disinfectant with the user interface of the processing unit (212). The reader (214) looks for a tag, label, or the like associated with a use container (252-258) in the vicinity of the unit (212) that the user has brought to be filled. The processing unit (212) continues to scan for a nearby tag with information stored in the database (Blocks 508-510). (FIG. 6A shows an example user interface screen 600 of the processing unit (212) scanning for containers.)

When the use container (252-258) is scanned, the processing unit (212) prompts the user to enter what percentage of the use container still contains unused disinfectant (Block 512). (FIGS. 6B-6C show example user interface screens 610-620 of the processing unit (212) prompting the user to enter an amount of disinfectant left in the use container (252-258).) To maintain consistency in the disinfectant dispensed, the processing unit (212) instructs the user to dispose of the unused disinfectant (Block 514).

Once this is done, the container's tag is re-encoded for tracking (Block 516), and the user refills the use container (252-258) with new disinfectant having its known expiration. When re-encoding the tag, the processing unit (212) may use the writer (214) to provide a new RFID for the container (252-258). Alternatively, however, the RFID of the tag is not rewritten. Instead, the information associated with the particular RFID is merely updated in the databases of the system 200.

The user is then prompted to confirm what re-fill amount has been dispensed (Block 518). (FIGS. 6D-6F show example user interface screens 630-650 of the processing unit (212) prompting the user to confirm the amount dispensed into the use container.) These steps are repeated as the user brings use containers and until the distribution container (250) is depleted. Once the distribution container (250) is depleted, the event is recorded with a new expiration event.

As noted above, FIG. 6A shows an example user interface screen 600 of the processing unit (212) scanning for use containers (252-258). On this dispenser screen 600, information 602 about one or more of the existing distribution containers (250) for dispensing the expirable disinfectant is displayed. For example, the information 602 can include the expiration date of the disinfectant in the distribution container, the date the distribution container was filled (i.e., its disinfectant manufactured), and the amount of the disinfectant already dispensed. As will be appreciated, other information could be tracked and provided.

As noted above, FIGS. 6B-6C show example user interface screens 610-620 of the processing unit (212) prompting the user to enter an amount of disinfectant left in a use container (252-258) when bringing the use container to be filled. Having scanned for the use container, the processing unit (212) obtains recorded information about the use container and displays some of the container details 612. For example, the scanned use container shown in FIG. 6B is a 16-oz spay bottle.

User input elements 614 allow the user to indicate the amount of unused disinfectant contained in the use container. As shown on the screen 620 in FIG. 6C, for example, the user can enter the percentage and/or ounces left in the container using a slider 624 and/or manual input 622. Because the volume of the use container is known and tracked, entering this information can be accurate to the extent needed.

Once the excess disinfectant has been discarded, the user can then dispense new disinfectant from the associated distribution container into the now empty use container. As noted above, FIGS. 6D-6F show example user interface screens 630-650 of the processing unit (212) prompting the user to confirm the amount dispensed into the use container. In FIG. 6D, instructions 632 are displayed to the user to dispense the new disinfectant from the associated distribution container into the respective use container. As disclosed herein, this can be a manual process in which the user operates a manual pump to draw the disinfectant from the distribution container and visually fills the respective use container to the proper fill line. Alternatively and as also noted previously, this process can be automated at the filing stations using pumps, valves, and sensors.

The user can then be prompted to confirm the amount dispensed as shown in the screen 640 of FIG. 6E. Then, as shown in FIG. 6F, the information 602 about the distribution container (250) may be appropriately updated to track the amount dispensed and estimate the amount remaining in the distribution container (250).

During operations, the processing unit (210) can be used to generate reports, track how much disinfectant is expected to be present and dispensed in use containers, and perform other functions. FIG. 6G shows an example interface screen 660 of the processing unit (212) for generating reports. Various search criteria, categories, and the like 622 can be selected for generating a report, and the reported information can be displayed in tabular form 664 for review and potential export.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A monitoring system for a disinfectant, the system comprising:
    first identifiers associated with containers for distributed dispensing of the disinfectant, each of the containers being reusable and having a volume of the disinfectant, the volumes in the containers changing due to repeatable filling and dispensing of the disinfectant in the corresponding containers, the volume of the disinfectant in each container having a particular expiration;
    second identifiers associated with locations for treatment with the disinfectant;
    at least one reader reading the first and second identifiers;
    at least one database associating, for each of the identified containers, the volume and the particular expiration of the disinfectant contained therein and associating the locations with the identified containers used in the treatment; and
    processing equipment operatively coupled to the at least one reader and the at least one database, the processing equipment tracking the repeatable filling and dispensing of each of the volumes of the disinfectant, each of the particular expirations of the disinfectant associated with the tracked volumes, and each of the first identifiers of the identified containers having the tracked volumes, the processing equipment determining, based on the tracking, expiry of at least one of the tracked volumes of the disinfectant contained in at least one of the identified containers and tracking each of the treatments at the locations using the disinfectant from the tracked containers.

2. The system of claim 1, wherein the one or more identifiers comprise at least one of a Radio Frequency Identification tag, a bar code, a quick response (QR) code, a magnetic strip, a near field communication element, an optical element, and an electromagnetic element.

3. The system of claim 1, wherein the at least one reader is selected from the group consisting of a Radio Frequency Identification (RFID) reader, an optical scanner, a barcode reader, a Quick Response (QR) code reader, a magnetic strip reader, a near field communication device, an optical device, and an electromagnetic device.

4. The system of claim 1, wherein the processing equipment comprises one or more of a server, a computer, a tablet, a laptop computer, a kiosk, a cellular phone, and a smart phone.

5. The system of claim 1, wherein to track the repeatable filling and dispensing of each of the changing volumes of the disinfectant, the particular expirations of the disinfectant, and the identifiers of the containers, the processing equipment is configured to log dispensing of an amount of the disinfectant to a given one of the containers.

6. The system of claim 5, wherein to log the dispensed amount, the processing equipment is configured to associate the particular expiration of the dispensed amount with the identifier for the given container.

7. The system of claim 1, wherein to track the repeatable filling and dispensing of each of the changing volumes of the disinfectant, the particular expirations of the disinfectant, and the identifiers of the containers, the processing equipment is configured to log disposal of an amount of the disinfectant from a given one of the containers.

8. The system of claim 1, wherein to track the treatment of a given one of the locations with the disinfectant from a given one of the containers, the at least one reader reads the second identifier of the given location for association to the first identifier of the given container.

9. The system of claim 8, wherein the at least one reader comprises a second reader associated with the given container and reading the second identifier of the given location for associating with the tracked treatment.

10. The system of claim 8, wherein to track the treatment of the location with the disinfectant from the given container, the processing equipment is configured to associate, with the tracked treatment, information about the treatment, the information including one or more of a type of the treatment performed, a user performing the treatment, and a time of the treatment.

11. The system of claim 1, wherein to track the repeatable filling and dispensing of each of the changing volumes of the disinfectant, the particular expirations of the disinfectant, and the identifiers of the container, the processing equipment is configured to execute one or more rules.

12. The system of claim 11, wherein the processing equipment in the one or more rules is configured to at least one of:
generate an alert when at least one of the containers indicates containing the disinfectant past the particular expiration;
automatically dispose of the disinfectant from the at least one container indicated to contain the disinfectant past the particular expiration; and
instruct manual disposal of the disinfectant from the at least one container indicated to contain the disinfectant past the particular expiration.

13. The system of claim 1, wherein the at least one database further associates locations with the containers.

14. A monitoring system for a disinfectant, the system comprising:
a plurality of containers for distributed dispensing of the disinfectant, each of the containers being reusable and having a volume of the disinfectant, the volumes in the containers changing due to repeatable filling and dispensing of the disinfectant in the corresponding containers, the volume of the disinfectant in each container having a particular expiration;
a plurality of first identifiers associated with the containers;
a plurality of second identifiers associated with locations for treatment with the disinfectant;
at least one reader reading the first and second identifiers;
at least one database associating, for each of the identified containers, the volume and the particular expiration of the disinfectant contained therein and associating the locations with the identified containers used in the treatment; and
processing equipment operatively coupled to the at least one reader and the at least one database, the processing equipment tracking the repeatable filling and dispensing of each of the changing volumes of the disinfectant, each of the particular expirations of the disinfectant associated with the tracked volumes, and each of the identifiers of the containers having the tracked volumes, the processing equipment determining, based on the tracking, expiry of at least one of the tracked volumes of the disinfectant contained in at least one of the identified containers and tracking each of the treatments at the locations using the disinfectant from the identified containers tracking each of the treatments at the locations using the disinfectant from the identified containers.

15. The system of claim 14, wherein the containers comprise a distribution container being filled with the disinfectant at a source and transported to a facility for dispensing.

16. The system of claim 15, wherein the containers comprise a use container being filled with the disinfectant from the distribution container for dispensing at the facility.

17. The system of claim 16, wherein the use container comprises at least one of a spray bottle, an electrostatic sprayer, a hand-sanitizer dispenser, a disinfectant container, and a sanitation container.

18. The system of claim 14, wherein the processing equipment comprises a local processing unit at a facility.

19. The system of claim 18, wherein the processing equipment further comprises a remote processing unit operatively coupled to the local processing unit via a network connection.

20. The system of claim 9, wherein the at least one reader comprises a first reader different from the second reader and reading the first identifier associated with the given container.

21. A method of monitoring a disinfectant, the method comprising:
associating a plurality of first identifiers with a plurality of containers, each of the containers being reusable and storing a volume of the disinfectant for distributed dispensing, the volumes of the disinfectant in the containers changing due to repeatable filling and dispensing of the disinfectant in the corresponding containers, the volume of the disinfectant in each container having a particular expiration;
associating a plurality of second identifiers with a plurality of locations for treatment with the disinfectant;
obtaining, with the at least one reader of a monitoring system, one or more of the first identifiers associated with one or more of the containers for distributed dispensing of the disinfectant and one or more of the second identifiers associated with one or more of the locations;

storing, in at least one database, first information of the volume and the particular expiration of the disinfectant associated with each of the one or more identified containers and storing second information of the one or more identified locations associated with the identified containers used in the treatment;

tracking, with processing equipment of the monitoring system, each of the volumes of the disinfectant, each of the particular expirations of the disinfectant associated with the tracked volumes, each of the one or more identified containers using the first information;

tracking, with the processing equipment of the monitoring system, each of the treatments at the one or more identified locations using the disinfectant from the one or more identified containers using the second information; and determining, with the processing equipment based on the tracking, expiry of at least one of the tracked volumes of the disinfectant contained in at least one of the one or more identified containers.

22. The method of claim 21, wherein obtaining, with the at least one reader of the monitoring system, the one or more first identifiers comprises reading, with a first of the at least one reader, the one or more first identifiers associated with the one or more first containers.

23. The method of claim 22, wherein reading, with the first reader, the one or more first identifiers comprises electronically reading, with at least one Radio Frequency Identification (RFID) reader, at least one first RFID tag associated with the at least one first container when positioned in proximity to the at least one RFID reader.

24. The method of claim 22, wherein obtaining, with the at least one reader of the monitoring system, the one or more second identifiers comprises reading, with a second of the at least one reader different from the first reader, the one or more second identifiers associated with the one or more locations.

25. The method of claim 21, wherein storing, in the at least one database of the monitoring system, the first information comprises obtaining the first information from a remote source via a network connection.

26. The method of claim 21, wherein storing, in the at least one database of the monitoring system, the first information comprises tracking distribution of a first of the volumes from a first of the containers to the one or more second volumes of one or more second of the containers and updating the stored first information.

27. The method of claim 26, wherein tracking comprises determining that the first volume is past the associated expiration.

28. The method of claim 26, wherein tracking comprises determining that at least one of the one or more second volumes is past the associated expiration.

29. The method of claim 26, wherein tracking comprises determining that the first volume of the first container has been depleted.

30. The method of claim 26, wherein tracking comprises tracking disposal of an amount of the dispensed volume of the disinfectant not used.

31. The method of claim 26, further comprising metering the distribution of the disinfectant from the first volume to the one or more second volumes.

32. The method of claim 21, wherein tracking, with processing equipment, the treatment of a given one of the one or more locations with the disinfectant from a given one of the one or more containers comprises reading, with the at least one reader, the second identifier of the given location for association to the first identifier of the given container.

33. The method of claim 21, wherein reading, with the at least one reader, the second identifier of the given location for association to the first identifier of the given container comprises:

obtaining third information about the given location with a second of the at least one reader associated with the given container; and associating the third information with the given container.

34. The method of claim 33, wherein obtaining the third information about the given location comprises reading, with the second reader, the third information from the second identifier at the given location.

35. The method of claim 33, wherein the at least one reader comprises a first of the at least one reader different from the second reader and reading the first identifier associated with the given container.

36. The method of claim 21, wherein tracking, with processing equipment, each of the treatments at the one or more the identified locations using the disinfectant from the one or more identified containers comprises:

obtaining third information about each of the treatments; and associating the third information with the corresponding one or more identified containers, the third information including one or more of a type of the treatment performed, a user performing the treatment, and a time of the treatment.

37. A non-transitory program storage device having program instructions for controlling a programmable control device to perform a method of monitoring a disinfectant having an expiration according to claim 21.

* * * * *